United States Patent
Mandai et al.

(10) Patent No.: US 9,046,653 B2
(45) Date of Patent: Jun. 2, 2015

(54) PDL COMPENSATOR OPTICAL DEVICE, AND PDL COMPENSATION METHOD

(71) Applicant: Hitachi, Ltd.

(72) Inventors: Kohei Mandai, Tokyo (JP); Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 13/689,060

(22) Filed: Nov. 29, 2012

(65) Prior Publication Data

US 2013/0142507 A1  Jun. 6, 2013

(30) Foreign Application Priority Data

Dec. 5, 2011  (JP) .................................. 2011-265712

(51) Int. Cl.
| | |
|---|---|
| G02B 6/26 | (2006.01) |
| H04B 10/50 | (2013.01) |
| H04B 10/2507 | (2013.01) |
| G02B 6/27 | (2006.01) |

(52) U.S. Cl.
CPC ................ *G02B 6/26* (2013.01); *H04B 10/501* (2013.01); *H04B 10/2572* (2013.01); *G02B 6/272* (2013.01); *G02B 6/2793* (2013.01)

(58) Field of Classification Search
USPC ................................ 398/25, 28, 65, 184, 192
See application file for complete search history.

(56) References Cited

U.S. PATENT DOCUMENTS

| | | | |
|---|---|---|---|
| 7,067,795 B1 * | 6/2006 | Yan et al. ...................... | 250/225 |
| 2004/0047583 A1 | 3/2004 | Chiba et al. | |
| 2012/0063783 A1 * | 3/2012 | Vassilieva et al. .............. | 398/81 |

FOREIGN PATENT DOCUMENTS

| | | |
|---|---|---|
| JP | 2003-014956 A | 1/2003 |
| JP | 2004-151671 A | 5/2004 |

* cited by examiner

*Primary Examiner* — David Payne
*Assistant Examiner* — Casey Kretzer
(74) *Attorney, Agent, or Firm* — Foley & Lardner LLP

(57) ABSTRACT

A PDL compensation technique is provided that reduces the number of and the number of types of the PDL compensators even if it is uncertain to determine which of the two polarization principal axes of an optical device has a larger loss. The PDL compensator according to the present invention is configured to, before an optical signal input from a first or a second input/output terminal enters a PDL compensation device, switch between the first polarization principal axis and the second polarization principal axis of the optical signal depending on which of the first and the second polarization principal axes has a larger loss or gain.

5 Claims, 7 Drawing Sheets

PDL COMPENSATOR OPTICAL DEVICE, AND PDL COMPENSATION METHOD

CLAIM OF PRIORITY

The present application claims priority from Japanese patent application JP 2011-265712 filed on Dec. 5, 2011, the content of which is hereby incorporated by reference into this application.

FIELD OF THE INVENTION

The present invention relates to a PDL (polarization dependent loss) compensation technology used in optical communications systems.

BACKGROUND OF THE INVENTION

Generally, an optical device used in the optical communications systems has two polarization principal axes (PPAs) orthogonal to each other. The difference in loss between the two PPA is referred to as polarization dependent loss (PDL).

FIG. 1 is a schematic diagram of an optical device 1 having a PDL. The optical device 1 includes polarization beam splitters (PBSs) 2, 3 and optical waveguides connecting the PBSs 2, 3. The PBS 2 splits input light into a TE (Transverse Electric) wave and a TM (Transverse Magnetic) wave, those of which travel along the two orthogonal polarization principal axes, respectively. The PBS 3 combines the TM wave and TE wave and outputs the combined waves. A loss 4 is added to only the TE wave in the optical waveguide connecting the PBSs 2, 3.

Note that many actual optical devices do not always include the PBSs 2, 3 and loss 4 as explicit components and the optical device schematically shown in FIG. 1 is just an example to explain the PDL. Also note that a loss is added to not only the TE wave, but also to the TM wave; however, the loss 4 described herein denotes the difference in loss between the TE wave and TM wave. When the loss of the TM wave is larger than the loss of the TE wave, the loss 4 is to be added to the TM wave. In the case of a gain device, the difference in gain between the TE wave and TM wave is referred to as a polarization dependent gain (PDG). The PDG and PDL have a common in that both introduce differences in intensity between the two polarization principal axes, and therefore both the PDG and PDL are collectively treated as PDL in this description.

Upon input of an optical signal to an optical device with a PDL, insertion loss of the optical device varies according to the polarization states of the optical signal. As a result, the optical communications system may sometimes experience deterioration in transmission quality which in turn contributes to network failure. In the case of an optical polarization multiplexing transmitter, which combines two optical signals whose polarization states are orthogonal to each other and outputs the combined signals, the difference in loss introduced to the two optical signals before being combined becomes PDL.

FIG. 2 is a schematic diagram of an optical polarization multiplexing transmitter 5 having a PDL. Light output from a laser light source (Laser Diode: LD) 6 is split by a PBS 7 into a TE wave and a TM wave which are orthogonal to each other. After these waves are modulated by optical modulators 9, 10, respectively, a loss 11 is added to only the TE wave. A PBS 8 combines the TM wave and the TE wave and outputs the combined waves. The loss 11 denotes the difference in loss between the TE wave and TM wave. If the loss of the TM wave is larger than the loss of the TE wave, the loss 11 will be added to the TM wave. It cannot be denied that the loss 11 is added not only in the optical waveguide, but also in the PBSs 7, 8, the optical modulators 9, 10 and other components.

The PDL of the optical polarization multiplexing transmitter 5 increases an intensity difference between the two polarization waves before being combined and output. Consequently, the optical signal with the power-reduced polarization wave decreases the tolerance to light noise (i.e., amplified spontaneous emission noise), thereby drastically deteriorating the transmission quality.

FIG. 3 is a graph showing degradation of receiving sensitivity of a coherent receiver that receives dual polarization-quadrature phase shift keying (DP-QPSK) signal light generated by an optical polarization multiplexing transmitter 5. As shown in FIG. 3, for example, the tolerance to light noise decreases by as much as 1 dB or more for a PDL of 2 dB.

The PDL can be compensated for by another optical device in which its two polarization principal axes with losses are replaced with each other. This optical device is called a PDL compensation device or the like.

However, which of the waves traveling along the two polarization principal axes has a larger loss in an optical device having a PDL (hereinafter, the polarization principal axis having a larger loss is expressed as "an orientation of the PDL") varies from device to device. Even if the orientation of the PDL of an optical device is fixed and if the optical device with the PDL is connected with a PDL compensation device with a regular optical fiber, the polarization waves of an optical signal freely rotate in the optical fiber and the polarization state of the optical signal cannot be stable in the PDL compensation device, resulting in inappropriate compensation for the PDL.

Japanese Unexamined Patent Application Publication No. 2003-14956 discloses the background art of the present technical field. The publication describes a structure in which two fiber bragg gratings (FBGs), each having the same PDL, are connected with a polarization maintaining fiber (PMF) twisted by 90°. The PMF is an optical fiber applied with stress so as to constantly rotate the polarization of optical signals and is capable of obtaining optical signals whose polarization state stays the same at input and output terminals. The PMF twisted by 90° connects the two FBGs so that their PDLs are oriented orthogonal to each other, and the PDLs of the FPGs are thereby compensated for.

Japanese Unexamined Patent Application Publication No. 2004-151671 discloses a structure in which two Mach-zhender optical waveguides, each having the same PDL, are connected with a PMF twisted by 90°.

SUMMARY OF THE INVENTION

According to the aforementioned publications, connecting an optical device having a PDL and a PDL compensation device having a PDL oriented the same as that of the optical device with a PMF twisted by 90° can keep constant the orientation of the PDL of the optical device to be compensated for by the PDL compensation device.

For example, in Japanese Unexamined Patent Application Publication No. 2003-14956, a first-stage FBG with a loss on one polarization principal axis is connected to a second-stage FBG with a loss on the same polarization principal axis with a PMF whose polarization is twisted by 90°. As a result, the second-stage FBG generates a loss on the other polarization principal axis, which is different from the axis of the first-stage FBG, and the losses of the two polarization principal axes achieve a balance, thereby compensating for the PDLs of the first-stage and second-stage FBGs. However, since the orientations of the PDLs should be aligned with each other between the first-stage and second-stage FBGs, it is required to prepare a second-stage FBG whose PDL orientation matches the PDL orientation of the first-stage FBG.

Generally, the orientation of the PDL of the optical device varies from device to device, and therefore it is uncertain to determine which of the two polarization principal axes has a larger loss. Under these circumstances, a plurality of PDL compensators need to be prepared in accordance with the orientations of the PDL. The increase in number of the PDL compensators and in number of types of the PDL compensator causes an increase in price of the PDL compensator and management/screening cost.

The present invention has been made to solve the aforementioned problems and provides a PDL compensation technique that requires the reduced number of the PDL compensators and the reduced number of types of the PDL compensators even if it is uncertain which of the polarization principal axes has a larger loss.

The PDL compensator according to the present invention is configured to, before an optical signal input from a first or a second input/output terminal enters a PDL compensation device, switch between the first polarization principal axis and the second polarization principal axis of the optical signal to be input to the PDL compensation device depending on which of the first polarization principal axis and the second polarization principal axis has a larger loss or gain.

According to the PDL compensator of the present invention, the PDL can be compensated for irrespective of the orientation of the PDL of the optical device. This structure can reduce the number of and the number of types of the PDL compensators required for the optical polarization multiplexing transmitter.

DETAILED DESCRIPTION OF THE PREFERRED EMBODIMENTS

First Embodiment

Figure 4:
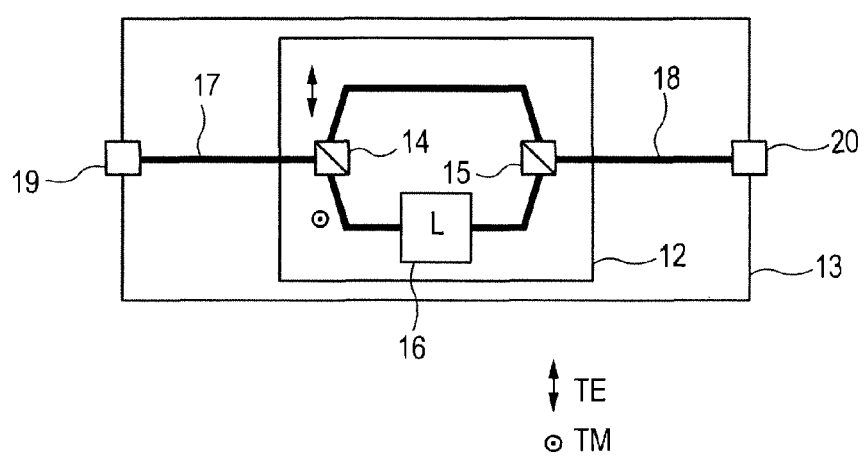
FIG. 4 is a diagram of a PDL compensator 13 according to the first embodiment.

FIG. 4 is a diagram of a PDL compensator 13 according to the first embodiment of the present invention. The PDL compensator 13 includes input/output terminals 19, 20, a PDL compensation device 12, a polarization maintaining connector 17, and a polarization rotating connector 18.

The PDL compensation device 12 includes two input/output ends, one of them being connected with the polarization maintaining connector 17 and the other being connected with the polarization rotating connector 18. The polarization maintaining connector 17 connects the input/output terminal 19 and the PDL compensation device 12, while the polarization rotating connector 18 connects the input/output terminal 20 and the PDL compensation device 12. The polarization maintaining connector 17 and polarization rotating connector 18 are devices for maintaining the polarization state of light, such as a PMF. In the first embodiment, the polarization rotating connector 18 corresponds to a "polarization switch unit".

Figure 5:
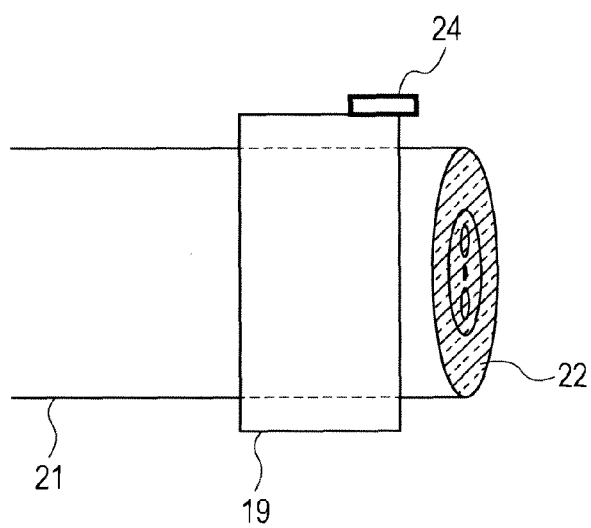
FIG. 5 is a diagram of an exemplary input/output terminal 19.

FIG. 5 is a diagram of the input/output terminal 19. The input/output terminal 20 also has the same structure. The input/output terminal 19 that has a projection, called a claw 24, is fixedly attached on a side of an end face 22 of a PMF 21. The claw 24 is a marking to indicate the orientation of the polarization state. The orientation indicated by the claw 24 aligns with one of polarization principal axes of the PMF 21. However, if the relationship between the orientation indicated by the claw 24 and the PSP is uniquely established, the orientation of the claw 24 does not always need to be aligned with the polarization principal axis of the PMF 21. In addition, the claw 24 need not be a projection as long as it functions as a marking indicating the orientation. For example, the marking may be a depression or an engraved mark. Although described later, alignment of the polarization principal axis of the PMF 21 with the polarization principal axis of the PDL compensation device 12 makes it possible to visually check the polarization principal axis of the PDL compensation device 12 by observing the input/output terminal 19.

The PDL compensation device 12 includes a PBS 14 and a PBS 15. The PBS 14 receives light input from the polarization maintaining connector 17 and separates the light into two orthogonal polarization waves, a TE wave and a TM wave. These TE wave and TM wave are polarization principal axes of the PDL compensation device 12. The PBS 15 recombines the TE wave and TM wave, which were separated by the PBS 14, and outputs the recombined light to the polarization rotating connector 18. A loss 16 denotes that one of the two polarization waves, which were separated by the PBS 14, has a larger loss than the other. The orientation of the polarization wave having the loss 16 is defined as the PDL orientation of the PDL compensation device 12.

The polarization maintaining connector 17 connects the input/output terminal 19 and the PDL compensation device 12 so that the polarization wave along the orientation indicated by the claw 24 is coupled with the TE wave or TM wave of the PDL compensation device 12 at the input/output terminal 19. In this structure, if light having suffered a PDL is input to the input/output terminal 19 so that the orientation of the PDL intersects at a right angle or aligns with the polarization orientation indicated by the claw 24 of the input/output terminal 19, the PDL of the PDL compensation device 12 compensates for the PDL of the light input to the PDL compensator 13.

The polarization rotating connector 18 connects the PDL compensation device 12 and the input/output terminal 20 so that, in the two polarization principal axes of the PDL compensation device 12, one axis that does not align with the polarization orientation indicated by the claw 24 of the input/output terminal 19 is aligned with the polarization orientation indicated by a claw 24 of the input/output terminal 20. With this configuration, the PDL orientation of the PDL compensator 13 can be changed by switching between the input/output terminals 19, 20 to which the light is input.

Given that an optical signal whose TM wave has a larger loss than the TE wave is input to the input/output terminal 19 of the PDL compensator 13. By aligning the PDL orientation of the PDL compensation device 12 with the TE wave, the PDL compensator 13 can equalize the losses generated in the TE wave and TM wave of the output light. In the case where conventional PDL compensators whose PDL orientation is fixed receives an optical signal whose TE wave has a larger loss than the TM wave, the PDL compensators cannot compensate for the loss of the optical signal.

However, the PDL compensator 13 according to the first embodiment can equalize the losses of the TE wave and TM wave by inputting the optical signal whose TE wave has a larger loss than the TM wave from the input/output terminal 20. Specifically, the polarization rotating connector 18 connects the input/output terminal 20 and the PDL compensation device 12 so as to rotate the orientation of the PDL by 90°, and the polarization state of an optical signal input from the input/output terminal 20 is rotated by 90°, thereby switching between the TE wave and the TM wave before the optical signal enters the PDL compensation device 12. Consequently, the PDL of the optical signal is compensated for in the PDL compensation device 12. Accordingly, a single PDL compensator 13 alone can complete compensation for PDL even if either the TE wave or the TM wave has a larger PDL.

First Embodiment

Modification

The structure of the PDL compensation device 12 is not limited to that shown in FIG. 4. For example, the PDL compensation device 12 can maintain its features even if one of the PBSs 14 and 15 is replaced with an optical coupler. In addition, the PDL compensation device 12 can be made up with a lens that diffuses light into space, an optical shutter that introduces a loss to the diffused light propagating in a direction, and a lens that collects the light diffused in space.

The structure of the PDL compensator 13 is not limited to that shown in FIG. 4. For example, the polarization rotating connector 18 is used to rotate the orientation of the PDL in the above description; however, the PDL compensation device 12 can have the function inside thereof. Specifically, the PBSs 14 and 15 are adapted to switch between the polarization principal axes, one of the axes is coupled with the loss 16, and the polarization rotating connector 18 is adapted to connect the PDL compensation device 12 and the input/output terminal 20 such that, in the polarization principal axes of the PDL compensation device 12, one axis that aligns with the polarization orientation indicated by the claw 24 of the input/output terminal 19 is aligned with the polarization orientation indicated by the claw 24 of the input/output terminal 20.

The PDL compensator 13 can dispense with the polarization maintaining connector 17 and polarization rotating connector 18 if the input end of the PBS 14 is integrally formed with the input/output terminal 19 and the output end of the PBS 15 is integrally formed with input/output terminal 20. In addition, if the PDL compensator 13 employs a variable optical attenuator (VOA) to generate the loss 16, the amount of compensation for PDL can be variable.

The PMF has a polarization principal axis (slow axis) along which light travels at a fast propagation speed and a polarization principal axis (fast axis) along which light travels at a slow propagation speed. Light separated and propagating along the slow axis and fast axis in the PMF generates a differential delay, called polarization mode dispersion (PMD), which causes deterioration of optical waveforms. To prevent deterioration, the fast axis and slow axis in the polarization maintaining connector 17 and polarization rotating connector 18 are switched over such that an optical signal having propagated along the fast axis of the polarization maintaining connector 17 propagates along the slow axis of the polarization rotating connector 18, thereby compensating for the PMDs of the PMFs.

Second Embodiment

In the first embodiment, the orientation of the PDL for which the PDL compensator 13 compensates can be changed depending on which of the input/output terminals 19, 20 the optical signal is input to. The second embodiment of the present invention describes a PDL compensator 13 solely capable of changing the orientation of PDL with an input/output terminal 19 from which optical signals are fixedly input.

Figure 6:
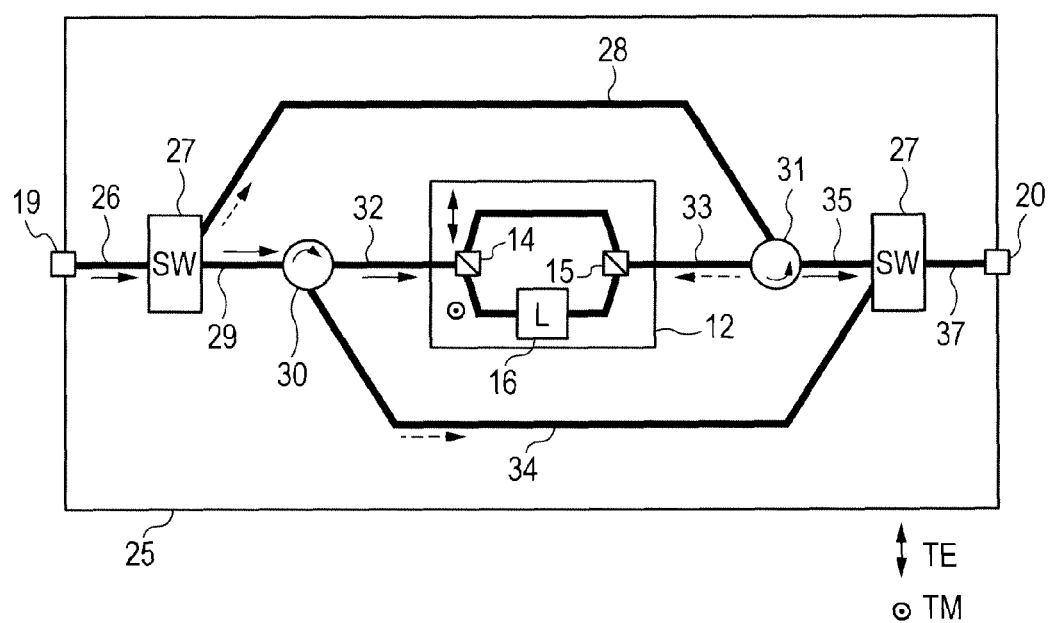
FIG. 6 is a diagram of a PDL compensator 25 according to the second embodiment.

FIG. 6 is a diagram of a PDL compensator 25 according to the second embodiment. In FIG. 6, like components are denoted by like numerals as in FIG. 4, and their explanation will be appropriately omitted.

The PDL compensator 25 includes input/output terminals 19, 20, a 1×2 optical switch 27, circulators 30, 31, a PDL compensation device 12, a 2×1 optical switch 36, polarization maintaining optical waveguides 26, 28, 29, 32, 33, and optical waveguides 34, 35, 37. The structure of the input/output terminals 19, 20 and PDL compensation device 12 is the same as that described for the first embodiment.

In the second embodiment, the 1×2 optical switch 27, the circulators 30, 31, the PDL compensation device 12, the 2×1 optical switch 36, the polarization maintaining optical waveguides 26, 28, 29, 32, 33, and the optical waveguides 34, 35, 37 correspond to the "polarization switch unit". The circulators 30, 31 correspond to a "first combining portion" and "second combining portion", respectively.

Each of the circulators 30, 31 connects three input/output paths. The connection configuration of the paths will be described later. The polarization maintaining optical waveguide 26 connects the input/output terminal 19 and the input end of the 1×2 optical switch 27. The polarization maintaining optical waveguide 28 connects one of output ends of the 1×2 optical switch 27 and the input end of the circulator 31. The polarization maintaining optical waveguide 29 connects the other output end of the 1×2 optical switch 27 and the input end of the circulator 30. The polarization maintaining optical waveguide 32 connects the circulator 30 and one of input/output ends of the PDL compensation device 12. The polarization maintaining optical waveguide 33 connects the circulator 31 and the other input/output end of the PDL compensation device 12. The optical waveguide 34 connects the circulator 30 and one of input ends of the 2×1 optical switch 36. The optical waveguide 35 connects the circulator 31 and the other input end of the 2×1 optical switch 36. The optical waveguide 37 connects the output end of the 2×1 optical switch 36 and the input/output terminal 20.

The 1×2 optical switch 27 outputs light input from the polarization maintaining optical waveguide 26 to any one of the polarization maintaining optical waveguides 28, 29. The circulator 30 outputs the light input from the polarization maintaining optical waveguide 29 to the polarization maintaining optical waveguide 32, while outputting light input from the polarization maintaining optical waveguide 32 to the optical waveguide 34. The circulator 31 outputs the light input from the polarization maintaining optical waveguide 28 to the polarization maintaining optical waveguide 33, while outputting light input from the polarization maintaining optical waveguide 33 to the optical waveguide 35. The 2×1 optical switch 36 outputs the light input from the optical waveguide 34 to the optical waveguide 37 when the 1×2 optical switch 27 directs light to the polarization maintaining optical waveguide 28, while outputting the light input from the optical waveguide 35 to the optical waveguide 37 when the 1×2 optical switch 27 directs light to the polarization maintaining optical waveguide 29.

In order to maintain the polarization state of light from the input/output terminal 19 to the input/output end of the PDL compensation device 12, the 1×2 optical switch 27, polarization maintaining optical waveguides 26, 28, 29, 32, 33, and circulators 30, 31 are made of optical waveguides, such as PMFs, capable of maintaining the polarization state at the input/output ends. The optical waveguides 34, 35, 37 are dedicated to propagation of the light output from the PDL compensation device 12 and therefore do not always need to maintain the polarization state.

If the polarization maintaining optical waveguides 28, 29, 32, 33 are PMFs, the PMFs, input/output terminal 19, 1×2 optical switch 27, circulators 30, 31, and PDL compensation device 12 are connected such that either one of the two polarization principal axes of the components is aligned with one another, thereby limiting the influence of PMD on the PMFs to only signal delay.

Since the optical signals are input only from the input/output terminal 19 in the second embodiment, the input/output terminal 20 does not need to have a marking, such as the claw 24 shown in FIG. 5, to indicate the polarization principal axis. However, the input/output terminal 20 needs a marking to indicate the orientation of the polarization to uniquely fix the orientation of polarization at the input/output terminal 20. In addition, the optical waveguides 34, 35, 37 and 2×1 optical switch 36 also need to be optical waveguides capable of maintaining the polarization state. If the optical waveguides 34, 35, 37 are PMFs, the PMFs, input/output terminal 20, circulators 30, 31 and 2×1 optical switch 36 are connected such that either one of the two polarization principal axes of the components is aligned with one another, thereby limiting the influence of PMD on the PMFs to only signal delay.

When the light input from the input/output terminal 19 enters the PDL compensation device 12 via the polarization maintaining optical waveguide 29, the polarization maintaining optical waveguides 26, 1×2 optical switch 27, the polarization maintaining optical waveguides 29, 32, and circulator 30 are connected such that the polarization orientation indicated by the claw 24 of the input/output terminal 19 is aligned with one of the two polarization principal axes of the PDL compensation device 12 at an input end of the PDL compensation device 12. When the light input from the input/output terminal 19 enters the PDL compensation device 12 via the polarization maintaining optical waveguide 28, the polarization maintaining optical waveguide 26, 1×2 optical switch 27, polarization maintaining optical waveguides 28, 33, and circulator 31 are connected such that the polarization orientation indicated by the claw 24 of the input/output terminal 19 is aligned with the other polarization principal axis of the PDL compensation device 12 at an input end of the PDL compensation device 12. This connection configuration can be achieved by, for example, switching the polarization orientation, which is to be aligned with one of the polarization principal axes of the PDL compensation device 12, between the polarization maintaining optical waveguides 32 and 33.

Second Embodiment

Modification

The structure of the PDL compensator 25 is not limited to that shown in FIG. 6. For example, as with the case of the modification of the first embodiment, the PBSs 14 and 15 are adapted to switch between the polarization principal axes, one of the axes is coupled with the loss 16, and therefore the polarization orientation indicated by the claw 24 of the input/output terminal 19 is aligned with the same polarization principal axis of the PDL compensation device 12 at the input ends of the PDL compensation device 12 when the light input from the input/output terminal 19 enters the PDL compensation device 12 both via the polarization maintaining optical waveguide 28 and via the polarization maintaining optical waveguide 29.

The PDL compensator 25 in this modification can maintain its functions without the polarization maintaining optical waveguides 26, 28, 29, 32, 33, and optical waveguides 34, 35 by directly connecting the input/output ends of the input/output terminals 19, 20, 1×2 optical switch 27, circulators 30, 31, PDL compensation device 12, and 2×1 optical switch 36. In addition, the 2×1 optical switch 36 can be replaced with a 2×1 optical coupler because light is input to only either one of the two input ends of the 2×1 optical switch 36.

If a variable optical attenuator is employed to generate the loss 16, the amount of PDL compensation by the PDL compensator 25 can be variable.

Furthermore, if it is allowed to switch between the fast axis and slow axis, along which the optical signal propagates, of the PMF that maintains the polarization state from the input/output terminal 19 to the input/output ends of the PDL compensation device 12 and the PMF that maintains the polarization state from the input/output ends of the PDL compensation device 12 to the input/output terminal 20, the PMFs can compensate for the PMD thereof.

Third Embodiment

The third embodiment of the present invention shows an exemplary structure of a PDL compensator in which the orientation of PDL is switched by a polarization switch. In the third embodiment, like components are denoted by like numerals as of the first embodiment shown in FIG. 4, and their explanation will be appropriately omitted.

Figure 7:
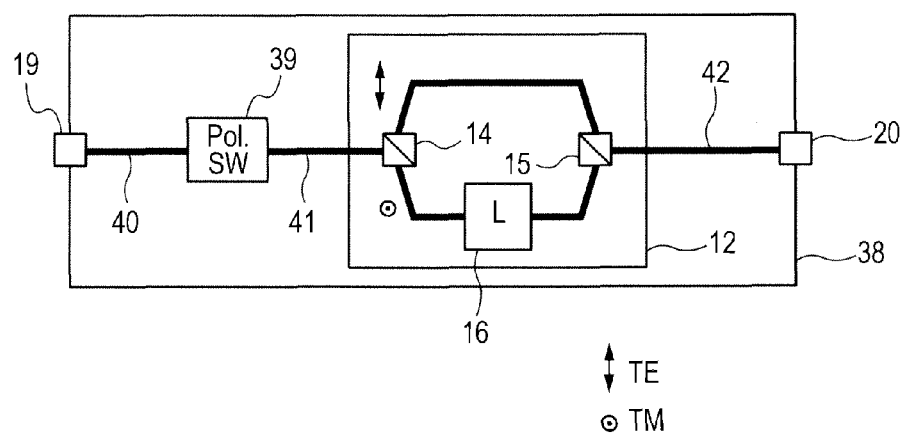
FIG. 7 is a diagram of a PDL compensator 38 according to the third embodiment.

FIG. 7 is a diagram of a PDL compensator 38 according to the third embodiment. The PDL compensator 38 includes an input/output terminal 19, a PDL compensation device 12, a polarization switch 39, an input/output terminal 20, polarization maintaining optical waveguides 40, 41, and an optical waveguide 42. The polarization switch 39 of the third embodiment corresponds to a "polarization switch unit".

The polarization maintaining optical waveguide 40 connects the input/output terminal 19 and the input end of the polarization switch 39. The polarization maintaining optical waveguide 41 connects the output end of the polarization switch 39 and the input end of the PDL compensation device 12. The optical waveguide 42 connects the output end of the PDL compensation device 12 and the input/output terminal 20.

For the purpose of maintaining the polarization state from the input/output terminal 19 to the input end of the PDL compensation device 12, the polarization maintaining optical waveguides 40, 41 and the polarization switch 39 are made of polarization-maintained optical waveguides. If the polarization maintaining optical waveguides 40, 41 are PMFs, the PMFs, input/output terminal 19, polarization switch 39, and PDL compensation device 12 are connected such that either one of the two polarization principal axes of the components is aligned with one another, thereby limiting the influence of PMD on the PMFs to only signal delay.

In the third embodiment in which the optical signal is input only from the input/output terminal 20, the input/output terminal 20 does not need a marking, such as a claw 24 as shown in FIG. 5, to indicate the polarization principal axis. However, the input/output terminal 20 needs a marking to indicate the orientation of the polarization to uniquely fix the orientation of the polarization at the input/output terminal 20. In addition, the optical waveguide 42 also needs to be an optical waveguide capable of maintaining the polarization state. If the optical waveguide 42 is a PMF, the PMF, input/output terminal 20, and PDL compensation device 12 are connected such that either one of the two polarization principal axes of the components is aligned with one another, thereby limiting the influence of PMD on the PMF to only signal delay.

The polarization maintaining optical waveguides 40, 41 and the polarization switch 39 are connected such that the polarization orientation indicated by the claw 24 of the input/output terminal 19 is aligned with one of the polarization principal axes of the PDL compensation device 12 at the input end of the PDL compensation device 12.

The polarization switch 39 has functions of rotating output polarization waves to allow a polarization wave, which propagates along the orientation indicated by the claw 24 of the input/output terminal 19 and is to be coupled with another polarization wave at the input end of the PDL compensation device 12, to be selectively switched to propagate along either one of the two polarization principal axes of the PDL compensation device 12. The polarization switch 39 may be any one of various polarization rotating means, such as a polarization rotator, a wave plate, and a polarization controller. The structure can provide the PDL compensator 38 capable of changing the orientation of PDL in accordance with polarization change by the polarization switch 39.

Third Embodiment

Modification

The structure of the PDL compensator 38 is not limited to that shown in FIG. 7. For example, the PDL compensator 38 in this modification can maintain the functions without the polarization maintaining optical waveguides 40, 41 by integrally forming the input end of the polarization switch 39 and the input/output terminal 19 and integrally forming the output end of the PBS 15 and the input/output terminal 20.

The polarization switch 39 can be integrally formed with the PDL compensation device 12, if the integration can provide the same effects as the third embodiment. For example, the polarization switch 39 and the polarization maintaining optical waveguide 41 can be omitted, and an optical switch can be added to switch between the polarization waves to introduce a loss 16 to one of the waves in the PDL compensation device 12.

If a variable optical attenuator is employed to generate the loss 16, the amount of PDL compensation by the PDL compensator 38 can be variable.

If the polarization maintaining optical waveguides 40, 41 are PMFs, allowing the fast axis and slow axis, along which the optical signal propagated, to be switched can compensate for PDM of both the PMFs.

Figure 8:
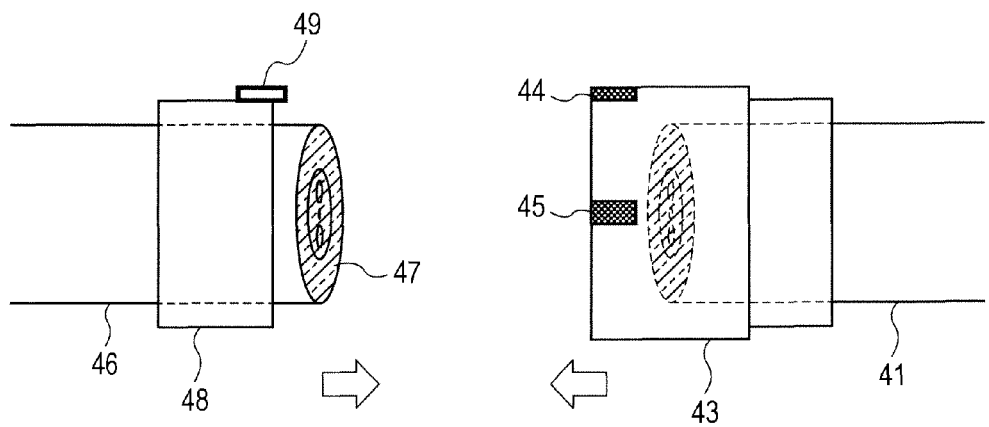
FIG. 8 depicts an example when a polarization switch 39 is designed to manually switch between the orientations of polarization waves.

FIG. 8 is a diagram showing an example of the polarization switch 39 adapted to manually change the orientation of the polarization. When the polarization maintaining optical waveguide 40 is omitted and the input end of the polarization switch 39 is integrally formed with the input/output terminal 19, the polarization switch 39 can be implemented by a polarization switch input terminal 43 as shown in FIG. 8.

The polarization switch input terminal 43 is a terminal attached to the input end of the polarization maintaining optical waveguide 41 and has two recessed portions 44, 45 on a side surface of the input end thereof. The recessed portions 44, 45 are separately formed by 90° apart from each other along the circumference of the terminal's cross section and indicate the orientations of the orthogonal polarization principal axes of the polarization maintaining optical waveguide 41, respectively. In addition, providing to an output end of the optical device with PDL a marking corresponding to the orientation of the PDL and selectively fitting the marking into either one of the two recessed portions 44, 45 provided on the side of the polarization switch input terminal 43 can compensate for the PDL in accordance with the orientation of the PDL of the optical device.

Given that an optical device having a PDL includes a PMF 46 that is located at an output end of the optical device and has a polarization principal axis aligned with the orientation of the PDL, the PMF 46 has a PMF output terminal 48 at the output end thereof, and the PMF output terminal 48 has a claw 49 on the side face thereof to indicate the orientation of the polarization principal axis of the PMF 46. In this case, the orientation of the PDL, which is to be compensated for by the PDL compensator 38, can be changed by switching between a state in which the PMF 46 and the polarization switch input terminal 43 are connected so that the claw 49 fits into the recessed portion 44 of the polarization switch input terminal 43 and a state in which the PMF 46 and the polarization switch input terminal 43 are connected so that the claw 49 fits into the recessed portion 45.

The structure of the polarization switch 39 is not limited to that shown in FIG. 8. For example, the polarization switch input terminal 43 can be modified to have two recessed portions 44, 45, which indicate the orientations of the polarization principal axes, on a side surface of the output end thereof, the polarization maintaining optical waveguide 41 can be modified to have a claw, which indicates the orientation of the polarization principal axis, on a side surface of the input end thereof. When the polarization switch input terminal 43 is connected to the polarization maintaining optical waveguide 41, the claw of the polarization maintaining optical waveguide 41 is selectively fit into either one of the recessed portions 44, 45 on the output end of the polarization switch input terminal 43.

Fourth Embodiment

The fourth embodiment of the present invention shows an exemplary structure of a PDL compensator in which the orientation of PDL is switched by a variable optical attenuator. In the fourth embodiment, like components are denoted by like numerals as of the first embodiment shown in FIG. 4, and their explanation will be appropriately omitted.

Figure 9:
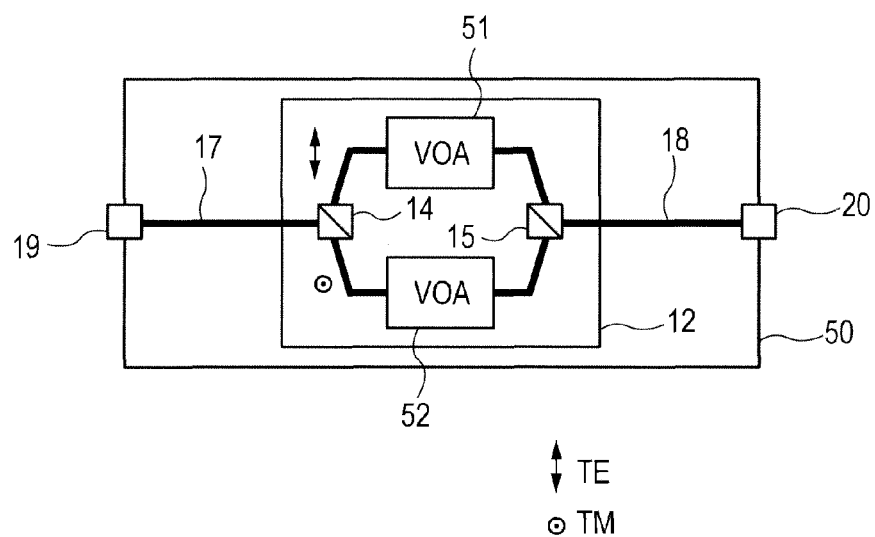
FIG. 9 is a diagram of a PDL compensator 50 according to the fourth embodiment.

FIG. 9 is a diagram of a PDL compensator 50 according to the fourth embodiment. The PDL compensator 50 includes, instead of the loss 16 shown in FIG. 4, variable optical attenuators 51, 52 interposed to the paths of TE waves and TM waves output from the PBS 14. The variable optical attenuators 51, 52 of the fourth embodiment correspond to a "polarization switch unit" and an "optical intensity adjustment unit".

Among the variable optical attenuators 51, 52, a variable optical attenuator, which is interposed to a path to add a loss to a polarization wave, is set to add a larger loss, while a variable optical attenuator, which is interposed to the other path, is set to add a smaller loss, thereby switching the orientation of the PDL of the PDL compensator 50 to any orientation. In addition, the magnitude of the PDL can be adjusted to any value.

The structure of the PDL compensator 50 is not limited to that shown in FIG. 9. For example, the loss of one of the variable optical attenuators 51, 52 can be fixed. However, if the loss of the variable optical attenuator 51 is fixed, the PDL range adjustable by the PDL compensator 50 is reduced, which increases minimum insertion loss. For example, if the loss of the variable optical attenuators 51, 52 is variable in a range of 0.5 to 5 dB, the PDL compensator 50 has an adjustable range of −4.5 to +4.5 dB with a minimum insertion loss of 0.5 dB; however, if the loss of the variable optical attenuator 51 is fixed to 2 dB, the PDL compensator 50 has an adjustable range of −1.5 to +3 dB with a minimum insertion loss of 1.2 dB.

Fifth Embodiment

Figure 1:
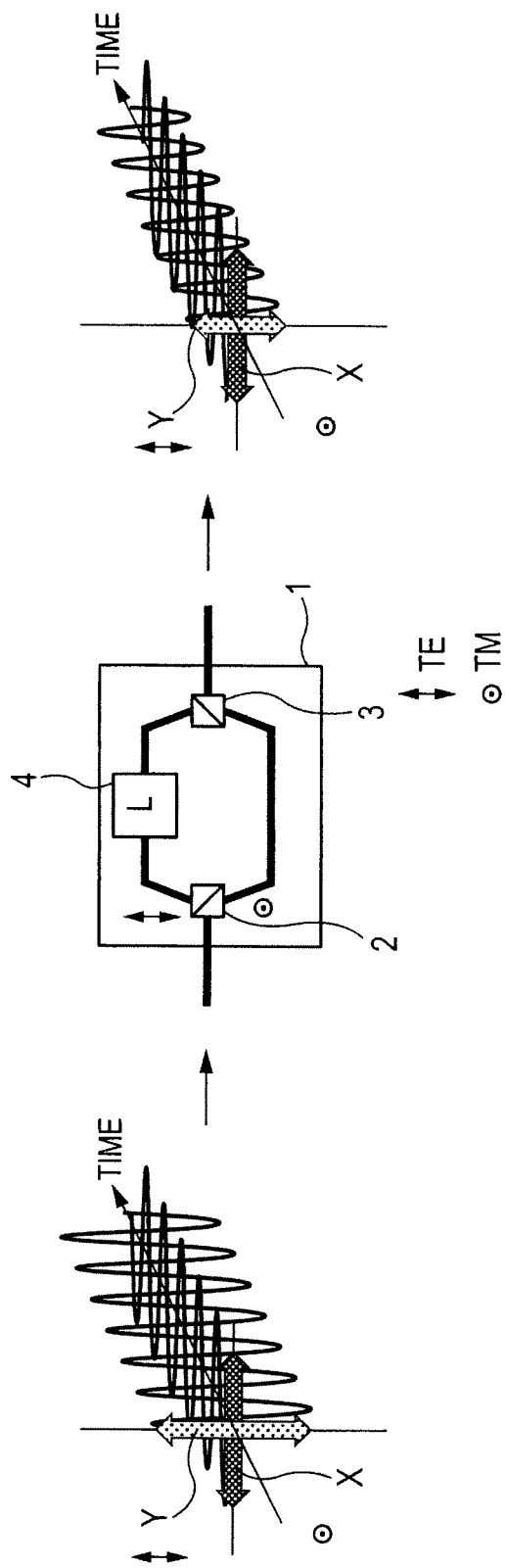
FIG. 1 is a schematic diagram of an optical device 1 having a PDL.
Figure 2:
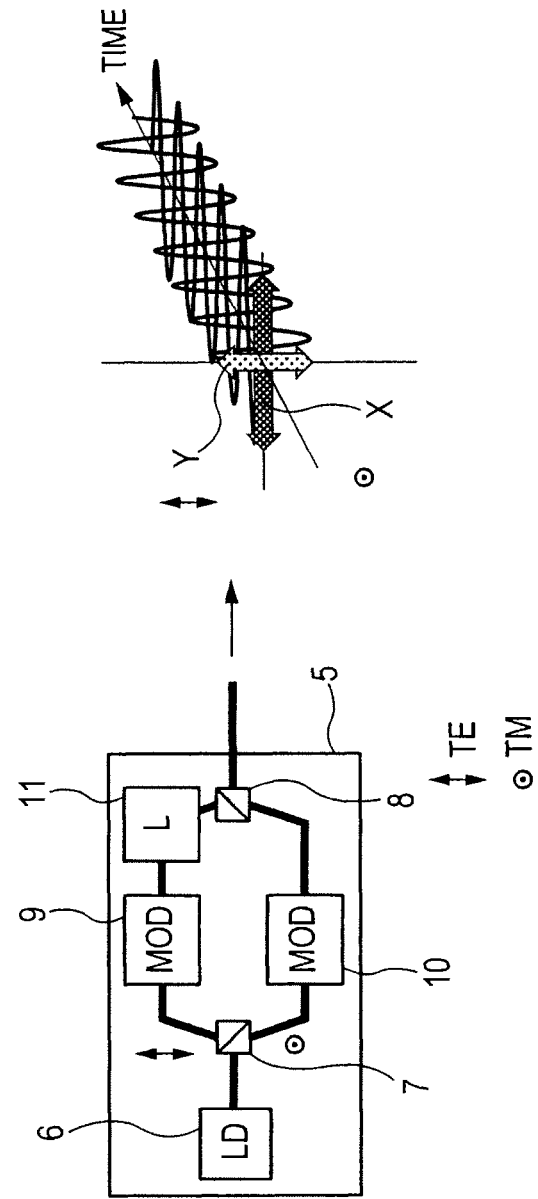
FIG. 2 is a schematic diagram of an optical polarization multiplexing transmitter 5 having a PDL.
Figure 3:
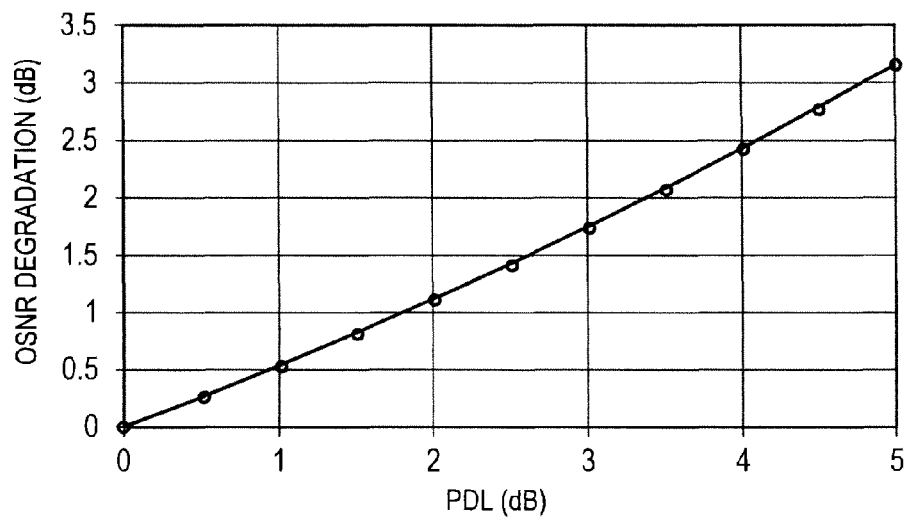
FIG. 3 is a graph indicating degradation of receiving sensitivity of a coherent receiver that receives DP-QPSK signal light.
Figure 10:
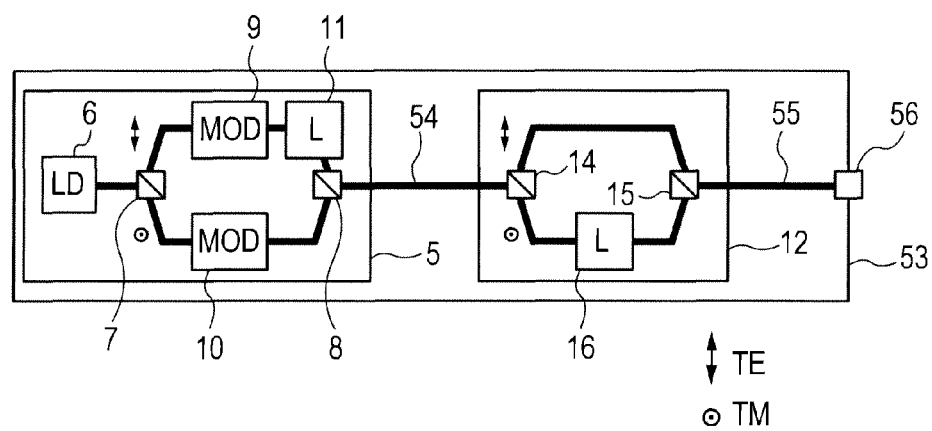
FIG. 10 is a diagram of an optical device 53 according to the fifth embodiment.

FIG. 10 is a diagram of an optical device 53 according to the fifth embodiment of the present invention. The optical device 53 is an optical device using an optical polarization multiplexing transmitter as an optical transmitter. In the fifth embodiment shown in FIG. 10, like components are denoted by like numerals as in FIGS. 2 and 4, and their explanation will be appropriately omitted.

The optical device 53 includes an optical polarization multiplexing transmitter 5, a PDL compensation device 12, an output terminal 56, a polarization maintaining optical waveguide 54, and an optical waveguide 55. The polarization maintaining optical waveguide 54 connects the output end of the optical polarization multiplexing transmitter 5 and the input end of the PDL compensation device 12. The optical waveguide 55 connects the output end of the PDL compensation device 12 and the output terminal 56.

The polarization maintaining optical waveguide 54 connects the optical polarization multiplexing transmitter 5 and the PDL compensation device 12 such that the polarization principal axes of the optical polarization multiplexing transmitter 5 and the PDL compensation device 12 are aligned with each other and the orientations of the PDLs of the optical polarization multiplexing transmitter 5 and the PDL compensation device 12 are interchanged. In order to fix the polarization state of light output from the output terminal 56, an optical waveguide capable of maintaining polarization states needs to be employed as the optical waveguide 55.

The optical device 53 can compensate for PDL of optical signals output from the optical polarization multiplexing transmitter 5 by the PDL compensator 12 to provide optical outputs in which the PDL has been compensated for.

The structure of the optical device 53 is not limited to that shown in FIG. 10. For example, the PDL compensation device 12 connected with the optical polarization multiplexing transmitter 5 can be replaced with the PDL compensators described in the first to fourth embodiments. In addition, various types of optical devices having PDL are applicable to the optical polarization multiplexing transmitter 5 in the fifth embodiment. Furthermore, the optical device with PDL can be connected to the output side of the PDL compensation device 12.

Sixth Embodiment

The sixth embodiment of the present invention provides an optical device having a function of automatically adjusting the orientation and magnitude of PDL. In the sixth embodiment, like components are denoted by like numerals as shown in FIG. 7, and their explanation will be appropriately omitted.

Figure 11:
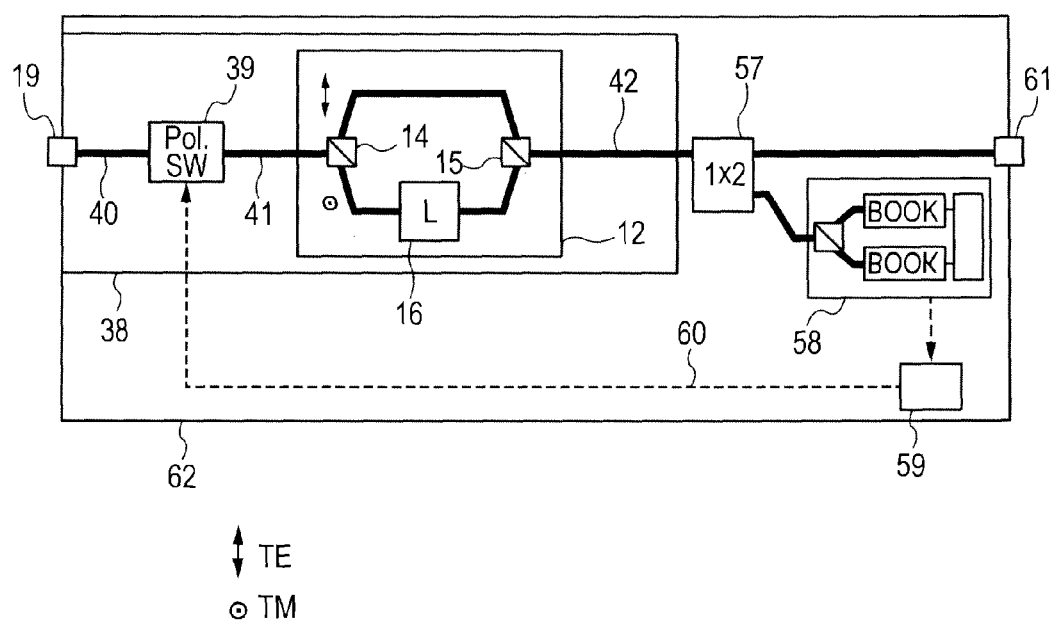
FIG. 11 is a diagram of an optical device 62 according to the sixth embodiment.

FIG. 11 is a diagram of an optical device 62 according to the sixth embodiment. The optical device 62 includes a PDL compensator 38, an optical splitter 57, a PDL monitor 58, a PDL controller 59, and an output terminal 61.

The optical splitter 57 divides light output from the PDL compensator 38 into two light beams and causes one of the light beams to be output from the output terminal 61 and the other to be input to the PDL monitor 58. The PDL monitor 58 monitors the PDL (or a physical quantity in correlation with the PDL) of the input light beam and outputs a monitored value to the PDL controller 59. The PDL controller 59 transmits a control signal 60 to the polarization switch 39 so that the PDL monitored by the PDL monitor 58 reaches a prescribed value, or, for example, the PDL is decreased. The polarization switch 39 changes the orientation of the PDL of the PDL compensator 38 in response to the control signal 60.

Sixth Embodiment

Modification

If the light to be input to the input/output terminal 19 is light having two orthogonal polarized waves both with an equal power level, such as an optical polarization multiplexed signal and noise light of an optical amplifier, a DOP (Degree of polarization) monitor can be used as a PDL monitor 58, for example. The DOP monitor measures the degree of polarization of input light, while the PDL controller 59 controls the polarization switch 39 so as to decrease the degree of polarization monitored by the DOP monitor.

If the light to be input to the input/output terminal 19 is an optical signal having a single polarization wave, a power meter can be used as the PDL monitor 58, for example. The power meter measures the intensity of input optical signals, while the PDL controller 59 controls the polarization switch 39 so as to bring the intensity monitored by the power meter close to a prescribed value.

In a case where an optical device 1 with a PDL is connected to the input/output terminal 19 of the optical device 62, the optical device 62 is adapted to include a test-light inserting portion at the input end of the optical device 1 to insert polarization multiplexed signals as test light, a PDL monitor 58 functioning as a DOP monitor that measures the degree of polarization of the test light, and a PDL controller 59 controlling the polarization switch 39 to decrease the degree of polarization monitored by the DOP monitor. Note that the test light is not limited to the polarization multiplexed signal and may be, for example, single-polarization signal light. In this case, since the DOP monitor cannot measure the PDL of the single-polarization signal light, an intensity monitor that measures the intensity of test light is used, instead of the DOP monitor, for example, and the polarization switch 39 is controlled to bring the intensity value close to a prescribed value.

In the sixth embodiment, the optical device 62 can be modified to include the PDL compensator 50, which is described in the fourth embodiment, instead of the PDL compensator 38. In this case, the amount of PDL of the PDL compensator 50 can be adjusted by the PDL controller 59 that adjusts the loss of the variable optical attenuators 51, 52. Alternatively, the optical device 62 can be modified to include, for example, the PDL compensator 25 of the second embodiment instead of the PDL compensator 38. In this case, the PDL controller 59 is designed to switch between output destinations of the 1×2 optical switch 27.

The optical device 62 can be modified to include a PDL compensator 25 instead of the PDL compensator 38. In this case, the optical device 1 with PDL is connected with the output of the PDL compensator 25 and the optical splitter 57 and PDL monitor 58 are interposed to the output of the optical device 1. In this structure, a test-light insertion portion that inserts polarization multiplexed signals as test light needs to be interposed to the input end of the PDL compensator 25 to operate the PDL monitor 58 serving as a DOP monitor.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A polarization dependent loss (PDL) compensator comprising:
   first and second input/output terminals configured to input and output optical signals;
   a PDL compensation device configured to create a loss or gain difference between a first polarization principal axis and a second polarization principal axis of an optical signal input from the first or second input/output terminal;
   a polarization switch unit configured to, before the optical signal input from the first or second input/output terminal enters the PDL compensation device, switch between the first polarization principal axis and the second polarization principal axis of the optical signal depending on which of the first polarization principal axis and the second polarization principal axis has a larger loss or gain;
   a first polarization maintaining optical waveguide connecting the first input/output terminal and an input end of a polarization connector portion, while maintaining the state of polarization of an optical signal propagating therethrough; and
   a second polarization maintaining optical waveguide connecting an output end of the polarization connector portion and an end of the PDL compensation device, while maintaining the state of polarization of an optical signal propagating therethrough, wherein
   the polarization switch unit is configured to function as a polarization switch that changes the state of polarization of the optical signal input from the first input/output terminal.

2. The PDL compensator according to claim 1, wherein
   the first polarization maintaining optical waveguide includes a first marking that indicates which of two polarization principal axes of a propagating optical signal has a larger loss or gain,
   the second polarization maintaining optical waveguide includes two second markings that indicate the orientation of the first polarization principal axis and the orientation of the second polarization principal axis of the PDL compensation device, and
   the polarization switch is configured to manually change the state of polarization of an optical signal input from the first input/output terminal by fitting the first marking to either one of the two second markings to manually connect the first and second polarization maintaining optical waveguides.

3. An optical device comprising:
   an optical transmitter configured to output optical signals with a loss or gain difference between two polarization principal axes; and
   a PDL compensator as cited claim 1, wherein
   the optical transmitter is connected with either first or second input/output terminal of the PDL compensator so that the polarization principal axis with a PDL introduced to an optical signal output by the optical transmitter is aligned with a first or second polarization principal axis of the PDL compensator.

4. The optical device according to claim 3, wherein
   the optical transmitter is an optical polarization multiplexing transmitter configured to combine optical signals each having two orthogonal polarization principal axes and outputs the combined optical signals.

5. An optical device comprising:
   a PDL compensator as cited in claim 1;
   an optical splitter configured to take a part of light output from the PDL compensator;
   a PDL meter configured to measure PDL introduced to the light taken out by the optical splitter or a physical quantity in correlation with the PDL; and
   a PDL controller configured to control a polarization switch unit to switch between a first polarization principal axis and a second polarization principal axis of an optical signal to be input to a PDL compensation device on which of the first polarization principal axis and the second polarization principal axis has a larger loss or gain based on a valued measured by the PDL meter, wherein
   the PDL controller is configured to determine which of the two polarization principal axes of the PDL compensator has a larger loss or gain and to control the polarization switch unit to perform the switching operation to equalize the losses or gains between the polarization principal axes of the optical signal output from the PDL compensator based on the determined result.

* * * * *